(12) United States Patent
Ko et al.

(10) Patent No.: US 8,071,490 B2
(45) Date of Patent: Dec. 6, 2011

(54) COMPOSITION OF ACRYLIC PRESSURE-SENSITIVE ADHESIVE AND SURFACE FINISHING MATERIAL COMPRISING THE SAME

(75) Inventors: Chang-bum Ko, Daejeon (KR);
Young-min Kim, Daejeon (KR);
Kong-ju Song, Daejeon (KR);
Kum-hyoung Lee, Daejeon (KR)

(73) Assignee: LG Chem, Ltd. (KR)

( * ) Notice: Subject to any disclaimer, the term of this patent is extended or adjusted under 35 U.S.C. 154(b) by 272 days.

(21) Appl. No.: 12/544,520

(22) Filed: Aug. 20, 2009

(65) Prior Publication Data

US 2010/0048077 A1     Feb. 25, 2010

(30) Foreign Application Priority Data

Aug. 20, 2008  (KR) ........................ 10-2008-0081201

(51) Int. Cl.
*B32B 27/04* (2006.01)
*B32B 27/06* (2006.01)
*C08L 33/06* (2006.01)

(52) U.S. Cl. ................. 442/151; 428/354; 428/355 AC; 524/560; 524/561

(58) Field of Classification Search .................. 442/151; 428/354, 355 AC; 524/560, 561
See application file for complete search history.

(56) References Cited

U.S. PATENT DOCUMENTS

| | | | |
|---|---|---|---|
| 5,438,096 A | 8/1995 | Wang et al. | |
| 6,114,426 A | 9/2000 | Burack et al. | |

FOREIGN PATENT DOCUMENTS

| | | | |
|---|---|---|---|
| JP | 2000-169811 A | 6/2000 | |
| JP | 2004-189771 A | 7/2004 | |
| JP | 2005-054174 A | 3/2005 | |
| KR | 19990080175 | 1/2000 | |

OTHER PUBLICATIONS

Office Action from corresponding Korean Application No. 10-2008-0081201 dated Mar. 21, 2011.

*Primary Examiner* — James J Seidleck
*Assistant Examiner* — Vu A Nguyen
(74) *Attorney, Agent, or Firm* — Lerner, David, Littenberg, Krumholz & Mentlik, LLP

(57) ABSTRACT

An acrylic pressure-sensitive adhesive composition according to the present invention comprises: acrylic copolymer (A) formed by copolymerizing i) alkyl(meth)acrylic acid ester monomer wherein the carbon atom of alkyl group is 2 to 14, ii) monomer having a functional group capable of crosslinking, iii) methyl(meth)acrylate monomer, iv) vinyl acetate monomer, v) glycidyl(meth)acrylate, and vi) crosslinking agent having 5 to 15 of alkyleneoxide groups and at least two acrylate group or vinyl group; and flame retardant (B). The acrylic pressure-sensitive adhesive composition improves the adhesive property and the dispersion of the flame retardant by controlling the crosslinking structure of the acrylic copolymer, such that a surface finishing material comprising the same can have the excellent adhesion and fireproof.

12 Claims, No Drawings

COMPOSITION OF ACRYLIC PRESSURE-SENSITIVE ADHESIVE AND SURFACE FINISHING MATERIAL COMPRISING THE SAME

CROSS REFERENCE TO RELATED APPLICATION

The present application claims the benefit of Korean Application No. 10-2008-0081201, filed Aug. 20, 2008, the disclosure of which is hereby incorporated by reference herein.

TECHNICAL FIELD

The present invention relates acrylic pressure-sensitive adhesive composition and a surface finishing material comprising the same, and more specifically, to acrylic pressure-sensitive adhesive composition that includes acryl copolymer A whose crosslinking structure is controlled by including crosslinking agent having 5 to 15 of alkyleneoxide groups and at least two acrylate group or vinyl group, and flame retardant (B) and a surface finishing material comprising the same.

BACKGROUND OF THE INVENTION

Recently, a surface finishing material in a sticker type that improves the existing veneer or sheet has been used as building interior/exterior materials. The surface finishing material in the sticker type is generally formed by additionally disposing an adhesive layer on a base sheet composed of a polymer material. The surface finishing material in the sticker type is simple in construction and work schedule as compared to the existing surface finishing material, thereby making it possible to easily change the interior without performing a separate interior construction. Therefore, the usage of the surface finishing material in the sticker type has been increased as the new building construction is reduced and the remodeling construction is increased in recent. The surface finishing material, which can feel the texture of wood, has been used in various fields, such as a table, a counter, a partition, a built-in wardrobe, a wall, an entrance, a door, a doorframe, etc. Further, since the base sheet for the surface finishing material in the sticker type can use metal, leather, and fabric materials in addition to a polymer material, its choice can be expanded according to the consumer desired atmosphere and purpose However, there is a problem in that the surface finishing material in the sticker type is easily combusted since it is composed of organic materials of carbon, hydrogen, and oxygen. In order to solve the problem, a method of using a large amount of flame retardant has a problem in increasing a defective rate in production or construction. At an early stage, developing materials having combustion resistance is focused. Recently, developing products having a fireproof effect as well as considering the stability of environment and human body is focused due to the environmental problem. Adhesives from which volatile organic compounds (VOC), dioxin, environment hormone, etc. are less generated are preferred as problems such as stability of workers, new house syndrome, etc. are on the rise due to the intensification of control over factors that can lead to the environmental problem worldwide. Therefore, the interest in a solvent-free adhesive that does not use an organic solvent, that is, a water-based adhesive using water as dispersant has been increased.

KR Laid-Open Patent No. 1999-0080175, JP Laid-Open Patent No. 2000-169811, and U.S. Pat. Nos. 6,114,426 and 5,438,096 disclose a technology of providing flame resistance to an adhesive.

In order to provide flame resistance to an adhesive, these patents generally uses bromine, halogenated, phosphate flame retardant, etc. or inorganic flame retardant such as antimony oxide and expects the flame retardant effect by adding various flame retardants, but do not show a substantial flame retardant effect.

In order to improve the flame resistance of the entire surface finishing material in the sticker type composed of the base sheet and the adhesive layer, there is a need to research characteristics of adhesive resin and a mixing effect with flame retardant according to the characteristics of adhesive resin in addition to simply adding flame retardant.

SUMMARY OF THE INVENTION

The present invention addresses the problems in the related art. In accordance with an embodiment of the present invention, an eco-friendly adhesive composition and a surface finishing material comprising the same have excellent adhesive property and fireproof performance by improving the dispersion of flame retardant for acrylic adhesive as a water-based adhesive that does not use an organic solvent in consideration of the stability of environment and human body and a surface finishing material comprising the same.

It is a feature of one aspect of the present invention that an acrylic pressure-sensitive adhesive composition comprises: based on 100 parts by weight of the following monomers i), ii), and iii) to form acrylic copolymer, acrylic copolymer (A) formed by copolymerizing i) 50 to 90 parts by weight of alkyl(meth)acrylic acid ester monomer wherein the carbon atom of alkyl group is 2 to 14, ii) 1 to 10 parts by weight of monomer having a functional group capable of crosslinking, iii) 10 to 20 parts by weight of methyl(meth)acrylate monomer, iv) 10 to 20 party by weight of vinyl acetate monomer, v) 0.1 to 2 parts by weight of glycidyl(meth)acrylate, and vi) 0.1 to 2 parts by weight of crosslinking agent having 5 to 15 of alkyleneoxide groups and at least two acrylate group or vinyl group; and flame retardant (B).

It is a feature of an aspect of the present invention that a surface finishing material comprises: a base layer; and an adhesive layer formed on one surface or both sides of the base layer, wherein the adhesive layer contains the acrylic pressure-sensitive adhesive composition according to the present invention.

It is a feature of one aspect of the present invention that an acrylic pressure-sensitive adhesive composition comprises: based on 100 parts by weight of following monomers i), ii), and iii) to form acrylic copolymer, acrylic copolymer (A) formed by copolymerizing i) 50 to 90 parts by weight of alkyl(meth)acrylic acid ester monomer wherein the carbon atom of alkyl group is 2 to 14, ii) 1 to 10 parts by weight of monomer having a functional group capable of crosslinking, iii) 10 to 20 parts by weight of methyl(meth)acrylate monomer, iv) 10 to 20 party by weight of vinyl acetate monomer, v) 0.1 to 2 parts by weight of glycidyl(meth)acrylate, and vi) 0.1 to 2 parts by weight of crosslinking agent having 5 to 15 of alkyleneoxide groups and at least two acrylate group or vinyl group; and flame retardant (B).

The acrylic pressure-sensitive adhesive composition according to the present invention is excellent in view of adhesive property and flame resistance by including acrylic copolymer forming a crosslinking structure by crosslinking agent having a long chain length and flame retardant The acrylic copolymer (A) according to the present invention preferably has 150,000 to 300,000 weight average molecule weight, more preferably, 200,000 to 250,000, when considering the adhesive property and the fireproof performance.

In addition, the gel content of resin is preferably from 40 to 80%, more preferably, from 50 to 70% when considering the adhesive property and the fireproof performance.

The acrylic pressure-sensitive adhesive composition according to the present invention shows the improved adhesive property and the excellent fireproof effect as well as improved retention due to excellent internal cohesion within the range of the weight average molecule weight and gel content.

DETAILED DESCRIPTION

Hereinafter, each component of the acrylic pressure-sensitive adhesive composition according to the present invention will be described in detail.

Acrylic Copolymer (A)

Acrylic copolymer (A) according to the present invention includes i) 50 to 90 parts by weight of alkyl(meth)acrylic acid ester monomer wherein the carbon atom of alkyl group is 2 to 14. The alkyl(meth)acrylic acid ester monomer wherein the carbon atom of alkyl group is 2 to 14 is not limited thereto. For example, the alkyl(meth)acrylic acid ester monomer may include ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylhexyl(meth)acrylate, n-octyl(meth)acrylate, isooctyl(meth)acrylate, isononyl(meth)acrylate, lauryl(meth)acrylate, or tetradecyl(meth)acrylate, etc. According to the present invention, these compounds may be used independently or jointly.

When the carbon atom of alkyl group is out of the range, the glass transition temperature of adhesive is increased or it is difficult to control adhesion. As a result, the carbon atoms preferably are 2 to 14.

Preferably, the content of alkyl(meth)acrylic acid ester monomer wherein the carbon atom of alkyl group is 2 to 14 is 50 to 90 parts by weight for every 100 parts by weight of total monomer to control adhesion and cohesion.

The acrylic copolymer (A) according to the present invention use alkyl(meth)acrylic acid ester monomer wherein the carbon atom of alkyl group is 2 to 14 as main component and includes 1 to 10 parts by weight of crosslinking functional group containing monomer as copolymerization component in order to improve cohesion and adhesion to an adhered surface.

The crosslinking functional group containing monomer is not limited thereto. For example, the crosslinking functional group containing monomer may include hydroxyl group containing monomer, such as 2-hydroxyethyl(meth)acrylate, 2-hydroxypropyl(meth)acrylate, 4-hydroxybutyl(meth)acrylate, 2-hydroxyethyleneglycol(meth)acrylate, 2-hydroxypropyleneglycol(meth)acrylate, etc.; carboxyl group containing monomer, such as acrylic acid, methacrylic acid, acrylic acid dimerization, itaconic acid, carboxyethylacrylate, carboxypentylacrylate, maleic acid, furmaric acid, etc.; and nitrogen containing monomer, such as acryl amide, N-vinyl pyrrolidone, N-vinyl caprolactam, etc. According to the present invention, these compounds may be used independently or jointly.

Preferably, the content of the crosslinking functional group containing monomer is 1 to 10 parts by weight. If the content is below 1 part by weight, the adhesive composition is too soft, such that the satisfactory adhesive property may not be secured. On the other hand, if the content exceeds 10 parts by weight, the adhesive composition is hard more than needs, such that the adhesion may be remarkably degraded.

The acrylic copolymer (A) according to the present invention includes iii) 10 to 20 parts by weight of methyl(meth)acrylate monomer and iv) 10 to 20 part by weights of vinylacetate monomer, which have high glass transition temperature, as copolymerization component, in addition to the monomers The acrylic copolymer (A) according to the present invention includes the methyl(meth)acrylate monomer and the vinylacetate monomer as copolymerization component, such that the adhesive component does not remain on the adhered surface upon removing the acrylic adhesive, thereby making it possible to prevent the contamination. If the content of the methyl(meth)acrylate monomer is below 10 parts by weight, the cohesion of the adhesive composition is weak, such that the adhesive property may be degraded. On the other hand, if the content exceeds 20 parts by weight, the cohesion of the adhesive composition is high more than needs, such that the satisfactory adhesive property may not be secured. Further, if the content of the vinylacetate monomer is below 10 parts by weight, the adhesive composition is soft, such that the initial adhesive property may be degraded. On the other hand, if the content exceeds 20 parts by weight, the adhesive composition is hard, such that the satisfactory adhesive property may not be secured.

The acrylic copolymer (A) of the present invention includes 0.1 to 2 parts by weight of v) glycidyl(meth)acrylate as copolymerization component in order to support the crosslinking effect of acrylic copolymer and supplement moisture resistance and heat resistance, in addition to the monomers. If the content of the glycidyl(meth)acrylate is below 0.1 parts by weight, the heat resistance supplement effect may be degraded. On the other hand, if the content exceeds 2 parts by weight, the heat resistance supplement effect can be obtained but the adhesive property can be degraded.

The acrylic copolymer (A) according to the present invention includes vi) 0.1 to 2 parts by weight of crosslinking agent having 5 to 15 of alkyleneoxide groups and at least two acrylate group or vinyl group.

The crosslinking agent includes 5 to 15 of alkyleneoxide groups, such that its chain length is long. The acrylic copolymer (A) according to the present invention forms the crosslinking structure by polymerizing the monomer component and the crosslinking agent, thereby securing a space between the polymer chains, in which the flame retardant can be dispersed and providing flexibility to the adhesive composition to improve the adhesive property and the flame resistance.

If the alkyleneoxide is below 5, the adhesive composition may be hard. On the other hand, if the alkyleneoxide exceeds 15, the adhesive composition is too soft, such that the adhesive property may be degraded.

In the present invention, the crosslinking agent having 5 to 15 of alkyleneoxide and at least two acrylate groups or vinyl group can be used without limitation. For example, polyethylene glycol diacrylate (PEGDA), poly propylene glycol diacrylate (PPGDA), 1,6-hexanediol ethoxylate diacrylate, 1,6-Hexanediol propoxylate diacrylate, neopentyl glycol ethoxylate diacrylate, neopentyl glycol propoxylate diacrylate, trimethylol propane ethoxylate triacrylate, trimethylol propane propoxylate triacrylate, pentaerythritol ethoxylate triacrylate, pentaerythritol propoxylate triacrylate, etc. can be selected. The crosslinking agent may be used independently or jointly.

The acrylic copolymer (A) according to the present invention may further include adhesion imparting agent in order to control the adhesive performance, in addition to the components. For example, the adhesion imparting agent may include (hydrogenation) hydrocarbon based resin, (hydrogenation) rosin resin, (hydrogenation) rosin ester resin, (hydrogenation) terpene resin, (hydrogenation) terpene phenol resin, polymerized rosin resin, or polymerized rosin ester resin, etc. The acrylic copolymer (A) according to the present invention may be used independently or jointly.

A polymerization method of the acrylic copolymer is not especially limited, but the acrylic copolymer can be prepared by emulsion polymerization, monomer addition, or seed polymerization in order to facilitate the control of reaction heat.

As a polymerization initiator, a water-soluble polymerization initiator, such as ammonium, persulfate of alkali metal, hydrogen peroxide, etc can be used when water is used as a solvent. Preferably, the polymerization initiator is used as 0.2 to 2 parts by weight for every 100 parts by weight of total monomer.

When the acrylic copolymer is prepared by the emulsion polymerization, the temperature of the polymerization reaction is preferably selected in the range of 0 to 100□ according to a kind of the polymerization initiator and when considering the adhesive property, it is more preferably selected in the range of 50 to 80□.

In the emulsion polymerization reaction, in order to initially generate particles, control the size of the generated particles, and increase the stability of particles, surfactant is used. The surfactant has a hydrophilic group and a lipophilic group. Anionic or non-ionic surfactant can be used. As the surfactant, there are alkyldiphenyloxide disulfonate, sodium polyoxyethylene alkyl ether sulfate, polyethylene oxide alkylaryl ether, etc. The surfactant according to the present invention may be used independently or jointly. The surfactant is preferably used as 0.5 to 2 parts by weight for every 100 parts by weight of total monomer.

The acrylic emulsion prepared by the above method can be used as main component of adhesive as it is and if necessary, can be used by being back neutralized with an alkaline material. As the alkaline material, hydroxide of mono metal or hetero metal, chloride, inorganic material such as carbonate, etc., ammonia, or organic amine, and the like can be used.

Flame Retardant (B)

The acrylic pressure-sensitive adhesive composition of the present invention includes the acrylic copolymer (A) and the flame retardant.

As the flame retardant included in the acrylic pressure-sensitive adhesive composition of the present invention, organic halogenated compound, non-halogenated compound such as phosphate compound, etc., or inorganic compound can be used. As the organic halogenated compound, there are decabromodiphenyl oxide, decabromodiphenyl ethane, octabromodiphenyl oxide, pentabromodiphenyl oxide, tetrabromodiphenyl oxide, tetrabromobisphenol A, tribromophenoxy ethane, octabromodiphenyl ether, chlorinated paraffin, etc. As the phosphate compound that is non-halogenated compound, there are phosphoric ester, polyphosphate, etc. As the inorganic compound, there are antimony trioxide, antimony pentoxide, aluminum hydroxide, magnesium hydroxide, calcium aluminate hydrate, etc.

Preferably, the content of the flame retardant is 30 to 70 parts by weight for every 100 parts by weight of acrylic copolymer (A) to have sufficient adhesion and flame resistance. If the content is below 30 parts by weight, the frame retardant does not meet the flame retardant standard and if the content exceeds 70 parts by weight, the cohesion of adhesive and the adhesive property are degraded.

For the specific purposes, the acrylic pressure-sensitive adhesive composition of the present invention can be used by properly adding ultraviolet stabilizer, antioxidant, colorant, reinforcing agent, filler, antifoaming agent, surfactant, plasticizer, etc. according to a general purpose, in addition to the above described components.

The present invention also relates to a surface finishing material including a base layer and an adhesive layer formed on one surface or both surfaces of the base layer and including the acrylic pressure-sensitive adhesive composition according to the present invention. The surface finishing material has the excellent peeling force, stress, and adhesion with respect to the adhered surface of various materials such as veneer board, gypsum board, asbestos straight, etc. and the excellent fireproof.

The surface finishing material of the present invention includes the adhesive layer formed from the acrylic pressure-sensitive adhesive composition according to the present invention on one surface or both surfaces of the base layer. The base layer is not especially limited. As the base layer composed of, for example, polymer resin, wood, leather, fabric, metal, etc., can be used. Further, the thickness of the adhesive layer is not limited thereto, but is preferably 50 to 60 μm. If the thickness is below 50 μm, there is a risk that the sufficient adhesion and the fireproof performance cannot be secured and if the thickness exceeds 60 μm, there is a risk that the economic efficiency can be degraded due to the increase in a dry time.

A method of forming the adhesive layer on one surface or both surfaces of the base layer is not especially limited. Therefore, a method of directly applying and drying the adhesive on the surface of the base layer using a barcode, etc. or a method of applying and drying the adhesive on a peelable base surface and then transferring the adhesive layer formed on the peelable base surface to the base layer and aging it, and the like can be used.

EXAMPLES

Hereinafter, the present invention will be described with reference to examples and comparative examples. This is to assist the understanding of the present invention and the scope of the present invention is not limited to the following examples.

Example 1

30 parts by weight of water and 0.5 parts by weight of alkyldiphenyloxide disulfonate as anionic surfactant were input in a glass reactor of 2 L capacity that includes a thermometer, an agitator, a dropping funnel, a nitrogen introducing pipe, and a recirculating cooler. The inside of the reactor was substituted into nitrogen under the agitation and the temperature of the inside of the reactor was increased to 70° C. under the nitrogen atmosphere. After 0.2 parts by weight of ammonium persulfate is added in the reactor and slowly dissolved, a monomer mixing solution formed by mixing and emulsifying a mixing solution of 55 parts by weight of butylacrylate as polymer composition, 20 parts by weight of 2-ethylhexylacrylate, 11 parts by weight of methylmethacrylate, 10 parts by weight of vinylacetate, 3 parts by weight of acrylic acid, 0.5 parts by weight of glycidyl methacrylate, 0.5 parts by weight of polyethyleneglycoldiacrylate (average added mole number of ethyleneoxide of 9 moles) that is crosslinking agent, and 10 parts by weight of adhesion imparting agent and a mixing solution including 1.0 part by weight of anionic surfactant and 50 parts by weight of water and 15 parts by weight of ammonium persulfate aqueous solution of 7 wt % concentration were dropped for 4 hours. After the dropping ends, 5 parts by weight of aqueous ammonium persulfate solution of 3 wt % concentration was input at a time. Thereafter, it was continuously maintained at a temperature of 80° C. for 1 hour, thereby completing the polymerization reaction.

After the polymerization completes, it was cooled at a room temperature and was neutralized with ammonia aqueous solution of 30 wt % concentration for 1 hour. The weight average molecule weight obtained by measuring the acryl emulsion resin prepared as above by a gel permeation chromatography (GPC) method was 210,000 and the gel content was 60%.

20 parts by weight of decaomodiphenylethane that is flame retardant and 20 parts by weight of antimony trioxide as flame retardant aids were mixed and prepared and then input in the acryl emulsion resin and they were agitated, thereby preparing the acrylic pressure-sensitive adhesive composition.

Example 2

Example 2 was performed in the same method as Example 1, except that Example 1 uses 0.25 parts by weight of polyethyleneglycoldiacrylate (average added mole number of ethyleneoxide of 9 moles) as the crosslinking agent of the monomer mixing solution.

Example 3

Example 3 was performed in the same method as Example 1, except that Example 1 uses 1.0 part by weight of polyethyleneglycoldiacrylate (average added mole number of ethyleneoxide of 9 moles) as the crosslinking agent of the monomer mixing solution.

Example 4

Example 4 was performed in the same method as Example 1, except that Example 1 uses 0.5 parts by weight of polypropyleneglycoldiacrylate (average added mole number of propyleneoxide of 8 moles) as the crosslinking agent of the monomer mixing solution.

Comparative Example 1

Comparative Example 1 was performed in the same method as Example 1, except that Example 1 uses 0.5 parts by weight of polyethyleneglycoldiacrylate (average added mole number of ethylene oxide of 4 moles) as the crosslinking agent of the monomer mixing solution.

Comparative Example 2

Comparative Example 2 was performed in the same method as Example 1, except that Example 1 uses 0.5 parts by weight of polypropyleneglycoldiacrylate (average added mole number of propyleneoxide of 3 moles) as the crosslinking agent of the monomer mixing solution.

Comparative Example 3

Comparative Example 3 was performed in the same method as Example 1, except that Example 1 uses 0.5 parts by weight of 3-(Trimethoxysilyl)propyl methacrylate) (TMSPMA) as the crosslinking agent of the monomer mixing solution.

Comparative Example 4

Comparative Example 4 was performed in the same method as Example 1, except that Example 1 drops 0.5 parts by weight of 3-(Trimethoxysilyl)propyl methacrylate) as the crosslinking agent of the monomer mixing solution and 15 parts by weight of ammonium persulfate aqueous solution of 11 wt % concentration for 4 hours.

Comparative Example 5

Comparative Example 5 was performed in the same method as Example 1, except that Example 1 drops 0.5 parts by weight of 3-(Trimethoxysilyl)propyl methacrylate) as the crosslinking agent of the monomer mixing solution and 15 parts by weight of ammonium persulfate aqueous solution of 3 wt % concentration for 4 hours.

Comparative Example 6

Comparative Example 6 was performed in the same method as Example 1, except that Example 1 uses 0.25 parts by weight of 3-(Trimethoxysilyl)propyl methacrylate) as the crosslinking agent of the monomer mixing solution.

Comparative Example 7

Comparative Example 7 was performed in the same method as Example 1, except that Example 1 uses 1.0 part by weight of 3-(Trimethoxysilyl)propyl methacrylate) as the crosslinking agent of the monomer mixing solution.

Comparative Example 8

Comparative Example 8 was performed in the same method as Example 1, except that Example 1 uses 0.5 parts by weight of 1,6-hexanediol diacrylate (HDDA) as the crosslinking agent of the monomer mixing solution.

Comparative Example 9

Comparative Example 9 was performed in the same method as Example 1, except that Example 1 uses 0.5 parts by weight of Trimethylolpropane triacrylate (TMPTA) as the crosslinking agent of the monomer mixing solution.

The kind, content, molecule weight of prepared acrylic emulsion resin, and gel content of the crosslinking agent that are used in the examples and the comparative examples are shown in the following Table 1.

TABLE 1

| Division | Crosslinking agent | | | | Molecule distribution | | |
|---|---|---|---|---|---|---|---|
| | Kind | Content (part by weight) | Number of E.O group | Number of P.O group | Weight average molecule weight | (Polydispersity index, PDI) | Gel content (%) |
| Example 1 | PEGDA | 0.5 | 9 | | 200,000 | 3.1 | 63 |
| Example 2 | PEGDA | 0.25 | 9 | | 190,000 | 3.0 | 57 |
| Example 3 | PEGDA | 1.0 | 9 | | 210,000 | 3.0 | 74 |
| Example 4 | PPGDA | 0.5 | | 8 | 210,000 | 3.0 | 61 |
| Comparative Example 1 | PEGDA | 0.5 | 4 | | 200,000 | 2.9 | 62 |
| Comparative Example 2 | PPGDA | 0.5 | | 3 | 210,000 | 3.0 | 61 |
| Comparative Example 3 | TMSPMA | 0.5 | | | 210,000 | 3.1 | 62 |
| Comparative Example 4 | TMSPMA | 0.5 | | | 130,000 | 2.6 | 56 |
| Comparative Example 5 | TMSPMA | 0.5 | | | 280,000 | 3.5 | 69 |
| Comparative Example 6 | TMSPMA | 0.25 | | | 200,000 | 3.0 | 56 |
| Comparative Example 7 | TMSPMA | 1.0 | | | 210,000 | 3.1 | 71 |
| Comparative Example 8 | HDDA | 0.5 | | | 210,000 | 3.0 | 60 |
| Comparative Example 9 | TMPTA | 0.5 | | | 200,000 | 2.9 | 63 |

*E.O group: Ethylene Oxide group
*P.O group: Propylene Oxide group

Test Example

The adhesive composition prepared in the examples and the comparative examples is applied and dried on each released paper by a coating and then laminated on one side of a vinyl chloride resin (PVC) sheet, thereby preparing a specimen of an adhesive product having an adhesive thickness of 55 μm. The adhesion and fireproof for the prepared adhesive product are evaluated by the following method and the evaluation results are shown in the following Table 2.

1) Adhesion

The adhesion depends on JIS Z 0237. The adhesive sheet was compressed on a depositing agent and the adhesion was measured after 20 minutes. The specimen size was prepared in 1 inch*10 cm.

2) Fireproof

The fireproof depends on KOFEIS 1001 standard and is shown in a carbonization area (in 30 cm$^2$) that is a passing standard of fireproof performance of a thin fabric. Three measurement specimens having a width of 35 cm and a length of 25 cm were prepared. The fireproof and adhesion for the prepared adhesive product are evaluated and are shown in the following Table 2.

TABLE 2

| Division | Adhesion (kgf/in) | Flame resistance (Carbonization area, cm$^2$) standard: within 30 cm$^2$ |
|---|---|---|
| Example 1 | 3.0 | 20 |
| Example 2 | 2.9 | 25 |
| Example 3 | 2.6 | 24 |
| Example 4 | 2.9 | 21 |
| Comparative Example 1 | 2.5 | 30 |
| Comparative Example 2 | 2.5 | 30 |
| Comparative Example 3 | 2.4 | 30 |
| Comparative Example 4 | 2.3 | 40 |
| Comparative Example 5 | 2.0 | 35 |
| Comparative Example 6 | 2.4 | 36 |
| Comparative Example 7 | 2.1 | 33 |
| Comparative Example 8 | 2.4 | 30 |
| Comparative Example 9 | 2.5 | 31 |

As shown in Table 2, Examples 1 to 4 including the crosslinking agent having a long chain length, show the excellent adhesion and flame resistance. In detail, Example 1 including the crosslinking agent having a long chain length has the excellent adhesion and flame resistance as compared to Comparative Example 1 having the similar weight average molecule weight and gel content. Further, Examples 2 and 3 including the crosslinking agent having a long chain length, have the excellent adhesion and flame resistance as compared to Comparative Examples 6 and 7 having the similar weight average molecule weight and gel content. Further, Example 4 has the excellent adhesion and flame resistance as compared to Comparative Example 2 having the similar weight average molecule weight and gel content When the chain length of the crosslinking agent is short in the range having the similar weight average molecule weight, it is determined that the adhesive is harder, such that the adhesion is degraded and the flame retardant has an insufficient space between the cross-linked copolymer, in which the flame retardant can uniformly be dispersed, such that it is difficult to secure the fireproof. In addition, when the chain length of the crosslinking agent is long, it is determined that the adhesive is softer, such that the adhesion is increased and the flame retardant has a sufficient space between the cross-linked copolymer, in which the flame retardant can uniformly dispersed, such that the fireproof performance can be secured.

Therefore, as the chain length of the case including the crosslinking agent including 5 to 15 of alkyleneoxide groups is long, the following results are obtained: the adhesive is softer, the adhesive property is improved, and the fireproof performance is excellent.

Further, as shown in Examples 1 to 4, when the weight average molecule weight is 150,000 and 300,000 and the gel content is 40 to 80%, the adhesion and flame resistance are improved.

As described above, controlling the weight average molecule weight, the gel content, and the crosslinking structure of acrylic copolymer makes the adhesive soft and can obtain the excellent adhesive property and the fireproof effect as compared to the case of improving the dispersion of the flame retardant.

With the present invention, the acrylic copolymer included as the acrylic pressure-sensitive adhesive composition forms the crosslinking structure by the crosslinking agent having a long chain length, thereby making the dispersion of the flame retardant excellent as well as the weight average molecule weight and gel content are controlled, thereby making the adhesion and fireproof performance excellent. In addition, the acrylic pressure-sensitive adhesive composition is formed on one surface or both surfaces of the base layer composed of polymer resin, wood, leather, fabric, metal, etc., such that it can be used for the surface finishing material in the sticker type.

What is claimed:

1. An acrylic pressure-sensitive adhesive composition comprising:
an acrylic copolymer (A) formed by copolymerizing i) 50 to 90 parts by weight of alkyl(meth)acrylic acid ester monomer having 2-14 carbon atoms in alkyl groups, ii) 1 to 10 parts by weight of monomer having a functional group capable of crosslinking, iii) 10 to 20 parts by weight of methyl(meth)acrylate monomer, iv) 10 to 20 party by weight of vinyl acetate monomer, v) 0.1 to 2 parts by weight of glycidyl(meth)acrylate, and vi) 0.1 to 2 parts by weight of crosslinking agent having 5 to 15 of alkyleneoxide groups and at least two acrylate group or vinyl group; and
a flame retardant (B).

2. The acrylic pressure-sensitive adhesive composition according to claim 1, wherein the weight average molecule weight of said acrylic copolymer (A) is 150,000 to 300,000 and the gel content of said acrylic copolymer is from 40 to 80%.

3. The acrylic pressure-sensitive adhesive composition according to claim 1, wherein said i) alkyl(meth)acrylic acid ester monomer having 2-14 carbon atoms in alkyl groups is one or more selected from a group consisting of ethyl(meth)acrylate, n-propyl(meth)acrylate, isopropyl(meth)acrylate, n-butyl(meth)acrylate, t-butyl(meth)acrylate, sec-butyl (meth)acrylate, pentyl(meth)acrylate, 2-ethylhexyl(meth) acrylate, n-octyl(meth)acrylate, isooctyl(meth)acrylate, isononyl(meth)acrylate, lauryl(meth)acrylate, and tetradecyl (meth)acrylate.

4. The acrylic pressure-sensitive adhesive composition according to claim 1, wherein said ii) monomer having a functional group capable of crosslinking is one or more selected from a group consisting of hydroxyl group containing monomer, carboxyl group containing monomer, and nitrogen containing monomer.

5. The acrylic pressure-sensitive adhesive composition according to claim 1, wherein said iv) crosslinking agent having 5 to 15 of alkyleneoxide groups and at least two acrylate group or vinyl group is one or more selected from a group consisting of polyethylene glycol diacrylate (PEGDA), polypropylene glycol diacrylate (PPGDA), 1,6-hexanediol ethoxylate diacrylate, 1,6-hexanediol propoxylate diacrylate, neopentyl glycol ethoxylate diacrylate, neopentyl glycol propoxylate diacrylate, trimethylol propane ethoxylate triacrylate, trimethylol propane propoxylate triacrylate, pentaerythritol ethoxylate triacrylate, and pentaerythritol propoxylate triacrylate.

6. The acrylic pressure-sensitive adhesive composition according to claim 1, wherein the acrylic copolymer (A) further includes an adhesion imparting agent.

7. The acrylic pressure-sensitive adhesive composition according to claim 1, wherein the flame retardant (B) is selected from a group consisting of organic halogenated compounds, phosphate compounds, and inorganic compounds.

8. The acrylic pressure-sensitive adhesive composition according to claim 1, wherein the amount of said flame retardant (B) is 30 to 70 parts by weight for 100 parts by weight of the acrylic copolymer (A).

9. The acrylic pressure-sensitive adhesive composition according to claim 1, further comprising an ultraviolet stabilizer, an antioxidant, a colorant, a reinforcing agent, a filler, an antifoaming agent, a surfactant, or a plasticizer.

10. A surface finishing material comprising:
a base layer; and
an adhesive layer formed on one or both sides of the base layer, wherein said adhesive layer comprises the acrylic pressure-sensitive adhesive composition according to claim 1.

11. The surface finishing material according to claim 10, wherein the base layer is polymer resin, wood, leather, fabric, or metal.

12. The surface finishing material according to claim 10, wherein the thickness of the adhesive layer is 50 to 60 μm.

* * * * *

UNITED STATES PATENT AND TRADEMARK OFFICE
CERTIFICATE OF CORRECTION

PATENT NO. : 8,071,490 B2
APPLICATION NO. : 12/544520
DATED : December 6, 2011
INVENTOR(S) : Chang Bum Ko et al.

It is certified that error appears in the above-identified patent and that said Letters Patent is hereby corrected as shown below:

On the Title page under Abstract Item (57), line 4, "atom of alkyl group" should read -- atom of an alkyl group --.
    On the Title page under Abstract Item (57), line 9, "acrylate group or vinyl group" should read -- acrylate groups or vinyl groups --.
    On the Title page under Abstract Item (57), line 14, "can have the excellent adhesion and fireproof" should read -- can have excellent adhesion and be fireproof --.
    Column 1, line 15, "relates acrylic" should read -- relates to an acrylic --.
    Column 1, line 18, "to acrylic" should read -- to an acrylic --.
    Column 1, line 21, "acrylate group or vinyl group" should read -- acrylate groups or vinyl groups --.
    Column 1, line 38, "increased in recent." should read -- increased in recent years. --.
    Column 2, line 4, "expects" should read -- expect --.
    Column 2, line 39, "acrylate group" should read -- acrylate groups --.
    Column 2, line 40, "group" should read -- groups --.
    Column 2, line 59, "acrylate group" should read -- acrylate groups --.
    Column 2, line 60, "group" should read -- groups --.
    Column 2, line 65, "flame retardant" should read -- flame retardant. --.
    Column 3, line 43, "use alkyl" should read -- uses alkyl --.
    Column 4, line 8, "monomers" should read -- monomers. --.
    Column 4, line 58, "group" should read -- groups --.
    Column 5, line 24, "100☐" should read -- 100° --.
    Column 5, line 27, "80☐" should read -- 80° --.
    Column 7, line 10, "completes" should read -- was completed --.
    Column 10, line 28, "gel content" should read -- gel content. --.
    Column 10, line 39, "can uniformly" should read -- can be uniformly --.
    Column 11, line 10, "party" should read -- parts --.
    Column 11, line 13, "acrylate group" should read -- acrylate groups --.
    Column 11, line 14, "group" should read -- groups --.

Signed and Sealed this
Nineteenth Day of March, 2013

Teresa Stanek Rea
*Acting Director of the United States Patent and Trademark Office*

CERTIFICATE OF CORRECTION (continued)
U.S. Pat. No. 8,071,490 B2

Column 13, line 2, "acrylate group or vinyl group" should read -- acrylate groups or vinyl groups --.